(12) United States Patent
Tessarolo et al.

(10) Patent No.: US 7,580,967 B2
(45) Date of Patent: Aug. 25, 2009

(54) PROCESSOR WITH MAXIMUM AND MINIMUM INSTRUCTIONS

(75) Inventors: Alexander Tessarolo, Sydney (AU); Karthikeyan Rajan Madathil, Bangalore (IN); G. Subash Chandar, Tamil Nadu (IN)

(73) Assignee: Texas Instruments Incorporated, Dallas, TX (US)

( * ) Notice: Subject to any disclaimer, the term of this patent is extended or adjusted under 35 U.S.C. 154(b) by 521 days.

(21) Appl. No.: 10/349,336

(22) Filed: Jan. 22, 2003

(65) Prior Publication Data

US 2003/0163499 A1 Aug. 28, 2003

Related U.S. Application Data

(60) Provisional application No. 60/361,025, filed on Feb. 28, 2002.

(51) Int. Cl.
*G06F 7/499* (2006.01)
(52) U.S. Cl. ...................................................... 708/552
(58) Field of Classification Search .................. 708/552
See application file for complete search history.

(56) References Cited

U.S. PATENT DOCUMENTS

| | | | | |
|---|---|---|---|---|
| 5,917,740 A | * | 6/1999 | Volkonsky | 708/552 |
| 6,219,685 B1 | * | 4/2001 | Story | 708/498 |
| 6,532,486 B1 | * | 3/2003 | Tessarolo | 708/552 |
| 6,535,900 B1 | * | 3/2003 | Perets et al. | 708/552 |
| 6,718,357 B2 | * | 4/2004 | Ha | 708/552 |

OTHER PUBLICATIONS

TMS320C28× DSP CPU and Instruction Set Reference Guide, Aug. 2001, pp. 1-695, Texas Instruments, Inc., U.S.A.

* cited by examiner

*Primary Examiner*—David H Malzahn
(74) *Attorney, Agent, or Firm*—Robert D. Marshall, Jr.; Wade J. Brady, III; Frederick J. Telecky, Jr.

(57) ABSTRACT

A method of operating a processor in a variable bit-length environment by performing a maximum limit function and minimum limit function. The method comprises accessing a most significant portion of a first number in a first register, wherein the most significant portion of the first number includes a first value. The method also includes accessing a most significant portion of a second number that includes a maximum/minimum limit, wherein the most significant portion of the second number includes a second value. The method includes changing the most significant portion of the first number to match the most significant portion of the second number if the first value is greater/less than the second value and storing the most significant portion of the first number in the first register.

2 Claims, 3 Drawing Sheets

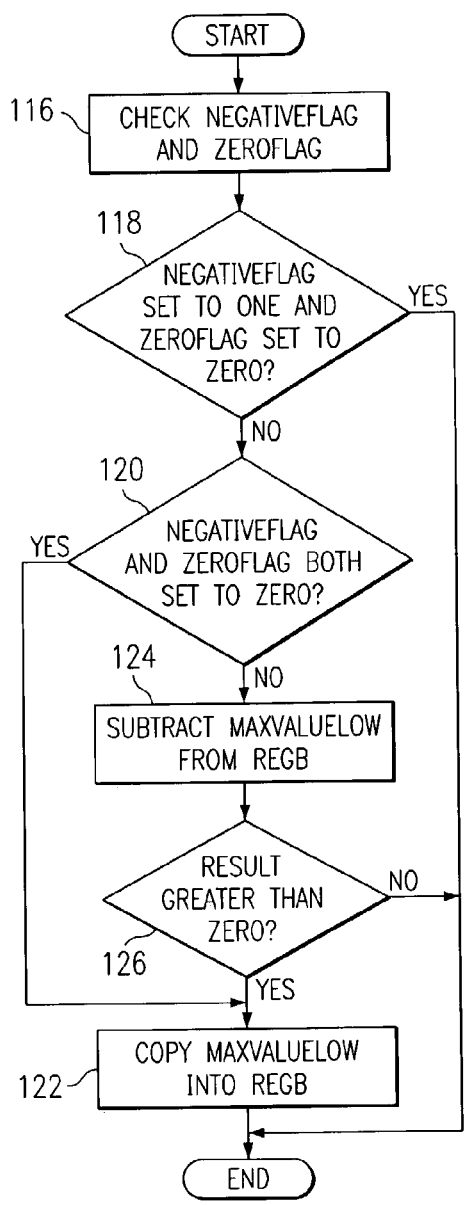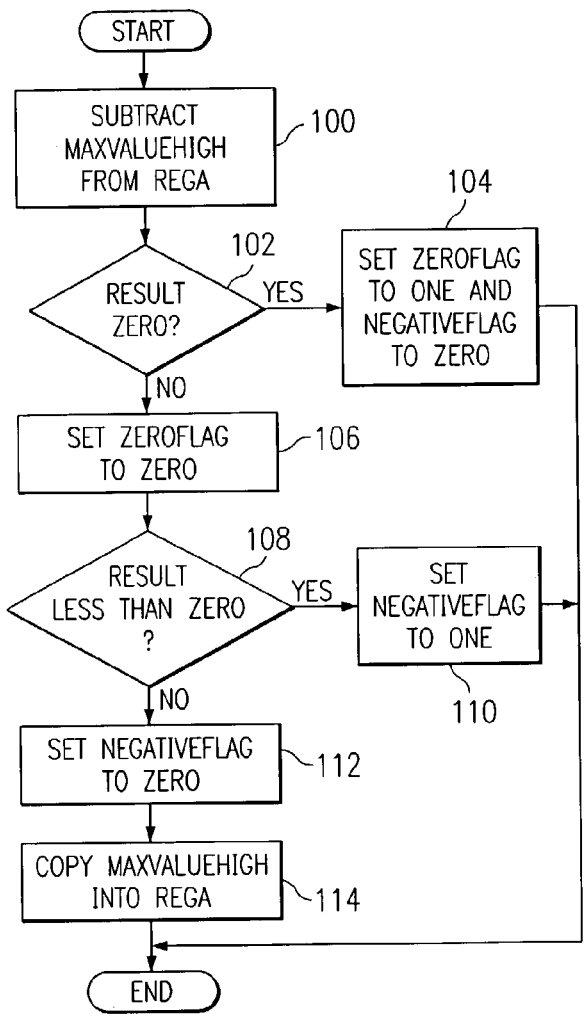

PROCESSOR WITH MAXIMUM AND MINIMUM INSTRUCTIONS

This application claims priority under 35 USC §119(e)(1) of Provisional Application No. 60/361,025, filed Feb. 28, 2002.

TECHNICAL FIELD OF THE INVENTION

This invention relates generally to processor operations and more particularly to limiting the value of a 64-bit number to a maximum value, minimum value, or both in a 32-bit environment.

BACKGROUND OF THE INVENTION

It may be necessary to limit the value of a 64-bit number to a maximum value, a minimum value, or both. For example, a 64-bit number may be used in one or more operations that are unable to handle numbers outside a particular range of values, and it may be necessary to limit the value of the 64-bit number prior to such operations. In a 32-bit environment, 64-bit numbers may occupy two 32-bit registers and may be processed 32-bits at a time. Limiting the value of a 64-bit number to a maximum value or a minimum value in a 32-bit environment typically involves many operations, which may increase code size and time requirements associated with such operations.

SUMMARY OF THE INVENTION

Particular embodiments of the present invention may reduce or eliminate disadvantages and problems traditionally associated with limiting the value of a 64-bit number to a maximum value, minimum value, or both in a 32-bit environment.

In one embodiment of the present invention, logic for limiting the value of a 64-bit number to a maximum limit in a 32-bit environment allocates one or more bit flags in a first operation. The logic accesses a most significant 32-bit portion of a first 64-bit number. The most significant 32-bit portion of the first 64-bit number includes a first value. The logic accesses a most significant 32-bit portion of a second 64-bit number including a maximum limit. The most significant 32-bit portion of the second 64-bit number includes a second value. The logic compares the first value with the second value and, if the first value is greater than the second value, sets the one or more allocated bit flags to indicate that the first value is greater than the second value and changes the most significant 32-bit portion of the first 64-bit number to match the most significant 32-bit portion of the second 64-bit number. If the first value is equal to the second value, the logic sets the one or more allocated bit flags to indicate that the first value is equal to the second value. In a second operation following the first operation, the logic accesses the one or more bit flags allocated in the first operation. If the one or more allocated bit flags indicate that the first value is greater than the second value, the logic accesses a least significant 32-bit portion of the first 64-bit number, accesses a least significant 32-bit portion of the second 64-bit number comprising the maximum limit, and changes the least significant 32-bit portion of the first 64-bit number to match the least significant 32-bit portion of the second 64-bit number. If the one or more allocated bit flags indicate that the first value is equal to the second value, the logic accesses the least significant 32-bit portion of the first 64-bit number. The least significant 32-bit portion of the first 64-bit number includes a third value. The logic accesses a least significant 32-bit portion of the second 64-bit number comprising the maximum limit. The least significant 32-bit portion of the second 64-bit number includes a fourth value. The logic compares the third value with the fourth value and, if the third value is greater than the fourth value, changes the least significant 32-bit portion of the first 64-bit number to match the least significant 32-bit portion of the second 64-bit number. In a more particular embodiment, the logic described above is executed by a digital signal processor (DSP).

Particular embodiments of the present invention may provide one or more technical advantages. Particular embodiments may limit the value of a 64-bit number to a maximum value, minimum value, or both in a 32-bit environment using only two operations. Such embodiments may in turn reduce code size and time requirements associated with limiting the value of a 64-bit number to a maximum value, minimum value, or both in a 32-bit environment. Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 2 illustrates an example MINL operation;
FIG. 3 illustrates an example MINCUL operation.

DESCRIPTION OF EXAMPLE EMBODIMENTS

Figure 1:
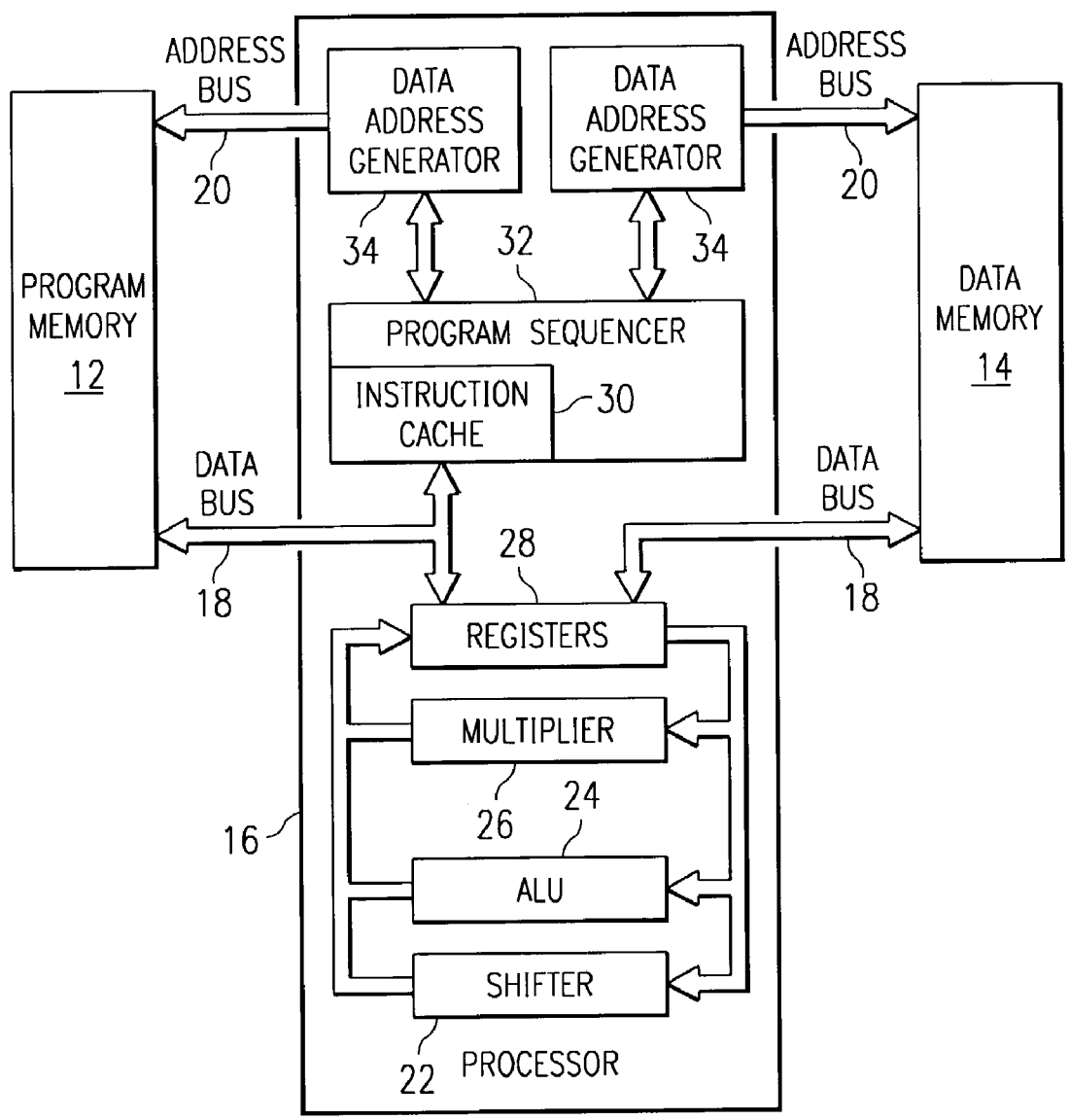
FIG. 1 illustrates an example processor system.

FIG. 1 illustrates an example processor system 10, which may include a digital signal processor (DSP). Although a particular processor system 10 is described and illustrated, the present invention contemplates any suitable processor system 10 including any suitable architecture. Processor system 10 may include program memory 12, data memory 14, and processor 16. Program memory 12 may be used to store program instructions for operations executed by processor 16, and data memory 14 may be used to store data used in operations executed by processor 16. Data (which may include program instructions, data used in operations executed by processor 16, or any other suitable data) may be communicated between processor 16 and program memory 12 and between processor 16 and data memory 14 using data buses 18, which may include any suitable physical medium for such communication. For example, data buses 18 may include one or more wires coupling processor 16 to program memory 12 and data memory 14. The number of bits that may be communicated across a data bus 18 in one clock cycle (which may include a unit of time between two adjacent pulses of a clock signal for processor system 10) may be limited. For example, in a 32-bit environment, a maximum of thirty-two bits may be communicated across each data bus 18 in one clock cycle. Data addresses (which may specify locations for data within program memory 12, data memory 14, or elsewhere and may, where appropriate, include the locations themselves) may be communicated between processor 16 and program memory 12 and between processor 16 and data memory 14 using address buses 20, which may include any suitable physical medium for such communication. For example, address buses 20 may include one or more wires coupling processor 16 with program memory 12 and data memory 14. Similar to data buses 18, the number of bits that may be communicated across an address bus 20 in one clock cycle may be limited.

Processor 16 may execute mathematical, logical, and any other suitable operations and may, for example only and not by way of limitation, include one or more shifters 22, arithmetic-logic units (ALUs) 24, multipliers 26, data registers 28, instruction caches 30, program sequencers 32, and data address generators 34. Although a particular processor 16 is described and illustrated, the present invention contemplates any suitable processor 16 including any suitable components. Shifter 22 may be used to left- or right-shift data units and perform other suitable tasks. ALU 24 may be used for addition, subtraction, absolute value operations, logical operations (such as, for example, AND, OR, NAND, NOR, and NOT operations), and other suitable tasks. Multiplier 26 may be used for multiplication and other suitable tasks. In a 32-bit environment, shifter 22, ALU 24, and multiplier 26 may each process a maximum of thirty-two bits in one clock cycle. For example, ALU 24 may in one clock cycle add numbers that include at most thirty-two bits. To add numbers that include more than thirty-two bits, the numbers may be divided into parts that each include thirty-two or fewer bits and added in parts. Registers 28 may include a number of memory locations for storing intermediate operation results, flags for program control, and the like. For example, registers 28 may include one or more general data registers, temporary registers, condition code registers (CCRs), status registers (SRs), address registers, and other suitable registers. In a 32-bit environment, each register 28 may be used to store a maximum of thirty-two bits. Instruction cache 30 may be used to store one or more program instructions for recurring operations. For example, program instructions for one or more operations that are part of a loop of operations executed by processor 16 may be stored using instruction cache 30 such that program memory 12 need not be accessed each time a program instruction for one or more of the operations is to be executed. Program sequencer 32 may direct the execution of operations by processor 16 and perform other suitable tasks. Data address generators 34 may communicate addresses to program memory 12 and data memory 14 specifying memory locations within program memory 12 and data memory 14 from which data may be read and to which data may be written. Although particular components of processor 16 are described as performing particular tasks, any suitable components of processor 16, alone or in combination, may perform any suitable tasks. In addition, although the components of processor 16 are described and illustrated as separate components, any suitable component of processor 16 may be wholly or partly incorporated into one or more other components of processor 16.

In a 32-bit environment including example processor system 10 or any other suitable processor system, it may be necessary to limit the value of a 64-bit number to a maximum value, a minimum value, or both. For example, a 64-bit number may be used in one or more operations that are unable to handle numbers outside a particular range of values, and it may be necessary to limit the value of the 64-bit number prior to such operations. In a 32-bit environment, as described above, a maximum of thirty-two bits may be communicated across data buses 18 in one clock cycle, register 28 may be used to store a maximum of thirty-two bits, and shifters 22, ALUs 24, and multipliers 26 may process a maximum of thirty-two bits in one clock cycle. As a result, limiting the value of a 64-bit number to a maximum value in such an environment may involve two operations, described more fully below. Similarly, limiting the value of a 64-bit number to a minimum value in such an environment may involve two operations, also described more fully below.

In particular embodiments, limiting the value of a 64-bit number to a maximum value may include comparing the value of the 64-bit number with the maximum value and, if the value of the 64-bit number is greater than the maximum value, changing the value of the 64-bit number to match the maximum value. The following operands may, as an example only and not by way of limitation, be defined for such an algorithm:

RegA:RegB=64-bit value
RegA=most significant thirty-two bits
RegB=least significant thirty-two bits
MaxValueHigh:MaxValueLow=64-bit value
MaxValueHigh=most significant thirty-two bits
MaxValueLow=least significant thirty-two bits RegA and RegB may each include, as an example only and not by way of limitation, separate 32-bit registers 28, and MaxValueHigh and MaxValueLow may each include, also by way of example, separate 32-bit memory locations within data memory 14. Although particular locations are described for RegA RegB, MaxValueHigh, and MaxValueLow, the present invention contemplates any suitable locations for these operands. The algorithm described above may, also by way of example, be described as follows using these operands:

if (RegA:RegB>MaxValueHigh:MaxValueLow)
    RegA:RegB=MaxValueHigh:MaxValueLow;

Such an algorithm may be implemented using two operations, which may in turn be implemented using software, hardware, or both. For example, the operations described herein for limiting the value of a 64-bit number to a maximum value may be executed by processor system 10. In the first operation, one or more bit flags may be allocated, and the value of the most significant thirty-two bits of a first 64-bit number may be compared with the value of the most significant thirty-two bits of a second 64-bit number, which second number may include a maximum limit value. If the value of the most significant thirty-two bits of the first number is greater than the value of the most significant thirty-two bits of the second number, the allocated bit flags may be set to indicate that the value of the most significant thirty-two bits of the first number is greater than the value of the most significant thirty-two bits of the second number. In addition to setting the allocated bit flags to indicate that the value of the most significant thirty-two bits of the first number is greater than the most significant thirty-two bits of the second number, the most significant thirty-two bits of the first number may be changed to match the most significant thirty-two bits of the second number. If the value of the most significant thirty-two bits of the first number is equal to the value of the most significant thirty-two bits of the second number, the allocated bit flags may be set to indicate that the value of the most significant thirty-two bits of the first number is equal to the value of the most significant thirty-two bits of the second number. If the value of the most significant thirty-two bits of the first number is less than the value of the most significant thirty-two bits of the second number, the allocated bit flags may be set to indicate that the value of the most significant thirty-two bits of the first number is less than the value of the most significant thirty-two bits of the second number.

In the second operation, which may follow the first operation, the allocated bit flags may be accessed to determine how the least significant thirty-two bits of the first number may be handled. If the allocated bit flags indicate that the value of the most significant thirty-two bits of the first number is greater than the value of the most significant thirty-two bits of the second number, the least significant thirty-two bits of the first number may be changed to match the least significant thirty-two bits of the second number. If the allocated bit flags indicate that the value of the most significant thirty-two bits of the first number is equal to the value of the most significant thirty-two bits of the second number, the value of the least significant thirty-two bits of the first number may be compared with the value of the least significant thirty-two bits of the second number and, if the value of the least significant thirty-two bits of the first number is greater than the value of the least significant thirty-two bits of the second number, the least significant thirty-two bits of the first number may be changed to match the least the significant thirty-two bits of the second number. Otherwise, no further action may be taken. If the allocated bit flags indicate that the value of the most significant thirty-two bits of the first number is less than the value of the most significant thirty-two bits of the second number (meaning that the value of the first number is necessarily less than the value of the second number), no further action may be taken.

Instructions for implementing these operations may, as an example only and not by way of limitation, be defined as follows using the operands described above:

```
MINL    RegA, MaxValueHigh    ; ZeroFlag = 0;
                              ; NegativeFlag = 0;
                              ; if((RegA – MaxValueHigh) > 0)
                              ;     RegA = MaxValueHigh;
                              ; if((RegA – MaxValueHigh) == 0)
                              ;     ZeroFlag = 1;
                              ;     NegativeFlag = 0;
                              ; if((RegA – MaxValueHigh) < 0)
                              ;     NegativeFlag = 1;
MINCUL  RegB, MaxValueLow     ; if((ZeroFlag == 0) &
                              ;     (NegativeFlag == 0))
                              ;     RegB = MaxValueLow;
                              ; if((ZeroFlag == 1) &
                              ;     (Negative Flag == 0)
                              ;     if((RegB – MaxValueLow) > 0)
                              ;         RegB = MaxValueLow;
```

MINL may include the first operation described above, and MINCUL may include the second operation described above. The subtraction of MaxValueHigh from RegA may include a signed subtraction, and the subtractions of MaxValueLow from RegB may include an unsigned subtraction. Central Processing Unit (CPU) status registers may be used for the bit flags, ZeroFlag and NegativeFlag.

FIG. 2 illustrates an example MINL operation. The operation begins at step 100, where MaxValueHigh is subtracted from RegA, which subtraction may, in particular embodiments, include a signed subtraction. MaxValueHigh and RegA may include a 32-bit memory location within data memory 14 and a 32-bit register 28, respectively, or other suitable location, and these operands may be accessed accordingly. At step 102, if the result of the subtraction of MaxValueHigh from RegA is zero, the operation proceeds to step 104. At step 104, ZeroFlag is set to one and NegativeFlag is set to zero (or left unchanged if NegativeFlag has already been set to zero), at which point the operation ends. At step 102, if the result of the subtraction of MaxValueHigh from RegA is not zero, the operation proceeds to step 106, where ZeroFlag is set to zero (or left unchanged if ZeroFlag has already been set to zero). At step 108, if the result of the subtraction of MaxValueHigh from RegA is less than zero, the operations proceeds to step 110. At step 110, NegativeFlag is set to one, and the operation ends. At step 108, if the result of the subtraction of MaxValueHigh from RegA is not less than zero, the operations proceeds to step 112. At step 112, NegativeFlag is set to zero (or left unchanged if NegativeFlag has already been set to zero). At step 114, MaxValueHigh is copied into RegA, at which point the operation ends.

FIG. 3 illustrates an example MINCUL operation. The operation begins at step 116, where NegativeFlag and ZeroFlag are checked. At step 118, if NegativeFlag is set to one and ZeroFlag is set to zero, the operation ends. At step 118, if NegativeFlag is not set to one or ZeroFlag is not set to zero, the operation proceeds to step 120. At step 120, if both NegativeFlag and ZeroFlag are set to zero, the operation proceeds to step 122. At step 122, MaxValueLow is copied into RegB, at which point the operation ends. At step 120, if either NegativeFlag or ZeroFlag is not set to zero, the operation proceeds to step 124. At step 124, MaxValueLow is subtracted from RegB, which subtraction may, in particular embodiments, include an unsigned subtraction. MaxValueLow and RegB may include a 32-bit memory location within data memory 14 and a 32-bit register 28, respectively, or other suitable location, and these operands may be accessed accordingly. At step 126, if the result of the subtraction of MaxValueLow from RegB is greater than zero, the operation proceeds to step 122. At step 126, if the result of the subtraction of MaxValueLow is not greater than zero, the operation ends.

In particular embodiments, limiting the value of a 64-bit number to a minimum value may include comparing the value of the 64-bit number with the minimum value and, if the value of the 64-bit number is less than the minimum value, changing the value of the 64-bit number to match the minimum value. The following operands may, as an example only and not by way of limitation, be defined for such an algorithm:

RegA:RegB=64-bit value
RegA=most significant thirty-two bits
RegB=least significant thirty-two bits
MinValueHigh:MinValueLow=64-bit value
MinValueHigh=most significant thirty-two bits
MinValueLow=least significant thirty-two bits RegA and RegB may each include, as an example only and not by way of limitation, separate 32-bit registers 28, and MinValueHigh and MinValueLow may each include, also by way of example, separate 32-bit memory locations within data memory 14. Although particular locations are described for RegA RegB, MinValueHigh, and MinValueLow, the present invention contemplates any suitable locations for these operands. The algorithm described above may, also by way of example, be described as follows using these operands:

if (RegA:RegB<MinValueHigh:MinValueLow)
    RegA:RegB=MinValueHigh:MinValueLow;

Such an algorithm may be implemented using two operations, which may in turn be implemented using software, hardware, or both. For example, the operations described herein for limiting the value of a 64-bit number to a minimum value may be executed by processor system 10. In the first operation, one or more bit flags may be allocated, and the value of the most significant thirty-two bits of a first 64-bit number may be compared with the value of the most significant thirty-two bits of a second 64-bit number, which second number may include a minimum limit value. If the value of the most significant thirty-two bits of the first number is greater than the value of the most significant thirty-two bits of the second number, the allocated bit flags may be set to indicate that the value of the most significant thirty-two bits of the first number is greater than the value of the most significant thirty-two bits of the second number. If the value of the most significant thirty-two bits of the first number is equal to the value of the most significant thirty-two bits of the second number, the allocated bit flags may be set to indicate that the value of the most significant thirty-two bits of the first number is equal to the value of the most significant thirty-two bits of the second number. If the value of the most significant thirty-two bits of the first number is less than the value of the most significant thirty-two bits of the second number, the allocated bit flags may be set to indicate that the value of the most significant thirty-two bits of the first number is less than the value of the most significant thirty-two bits of the second number. In addition to setting the allocated bit flags, the most significant thirty-two bits of the first number may be changed to match the most significant thirty-two bits of the second number.

In the second operation, which may follow the first operation, the allocated bit flags may be accessed to determine how the least significant thirty-two bits of the first number may be handled. If the allocated bit flags indicate that the value of the most significant thirty-two bits of the first number is less than the value of the most significant thirty-two bits of the second number (meaning that the value of the first number is necessarily less than the value of the second number), the least significant thirty-two bits of the first number may be changed to match the least significant thirty-two bits of the second number. If the allocated bit flags indicate that the value of the most significant thirty-two bits of the first number is equal to the value of the most significant thirty-two bits of the second number, the value of the least significant thirty-two bits of the first number may be compared with the value of the least significant thirty-two bits of the second number. If the value of the least significant thirty-two bits of the first number is less than the value of the least significant thirty-two bits of the second number, the least significant thirty-two bits of the first number may be changed to match the least the significant thirty-two bits of the second number. Otherwise, no further action may be taken. If the allocated bit flags indicate that the value of the most significant thirty-two bits of the first number is greater than the value of the most significant thirty-two bits of the second number, no further action may be taken.

Instructions for implementing these operations may, as an example only and not by way of limitation, be defined as follows using the operands described above:

```
MAXL    RegA, MinValueHigh      ; ZeroFlag = 0;
                                ; NegativeFlag = 1;
                                ; if((RegA – MinvalueHigh) > 0)
                                ;     NegativeFlag = 0;
                                ; if((RegA – MinValueHigh) == 0)
                                ;     ZeroFlag = 1;
                                ;     NegativeFlag = 0;
                                ; if((RegA – MinValueHigh) < 0)
                                ;     RegA = MinValueHigh;
MAXCUL  RegB, MinValueLow       ; if((ZeroFlag == 0) &
                                ;     (NegativeFlag == 1))
                                ;     RegB = MinValueLow;
                                ; if((ZeroFlag == 1) &
                                ;     (Negative Flag == 0))
                                ;     if((RegB – MinValueLow) < 0)
                                ;         RegB = MinValueLow;
```

MAXL may include the first operation described above, and MAXCUL may include the second operation described above. The subtraction of MinValueHigh from RegA may include a signed subtraction, and the subtractions of MinValueLow from RegB may include an unsigned subtraction. CPU status registers may be used for the bit flags, ZeroFlag and NegativeFlag.

Figure 4:
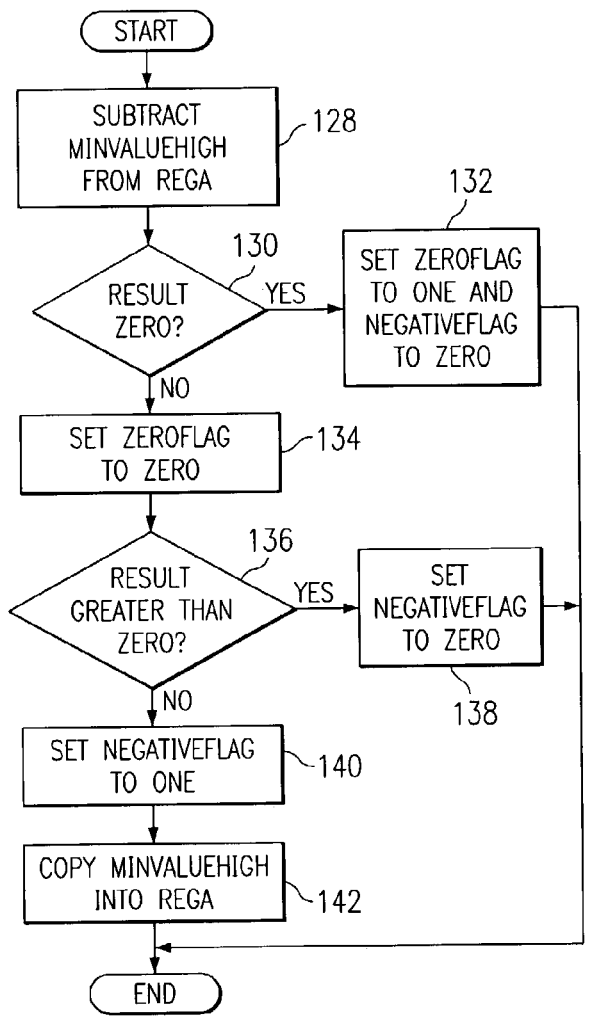
FIG. 4 illustrates an example MAXL operation.

FIG. 4 illustrates an example MAXL operation. The operation begins at step 128, where MinValueHigh is subtracted from RegA, which subtraction may, in particular embodiments, include a signed subtraction. MinValueHigh and RegA may include a 32-bit memory location within data memory 14 and a 32-bit register 28, respectively, or other suitable location, and these operands may be accessed accordingly. At step 130, if the result of the subtraction of MinValueHigh from RegA is zero, the operation proceeds to step 132. At step 130, ZeroFlag is set to one and NegativeFlag is set to zero (or left unchanged if NegativeFlag has already been set to zero), at which point the operation ends. At step 130, if the result of the subtraction of MinValueHigh from RegA is not zero, the operation proceeds to step 134. At step 134, ZeroFlag is set to zero (or left unchanged if ZeroFlag has already been set to zero). At step 136, if the result of the subtraction of MinValueHigh from RegA is greater than zero, the operation proceeds to step 138. At step 138, NegativeFlag is set to zero (or left unchanged if NegativeFlag has already been set to zero), at which point the operation ends. At step 140, NegativeFlag is set to one. At step 142, MinValueHigh is copied into RegA, at which point the operation ends.

Figure 5:
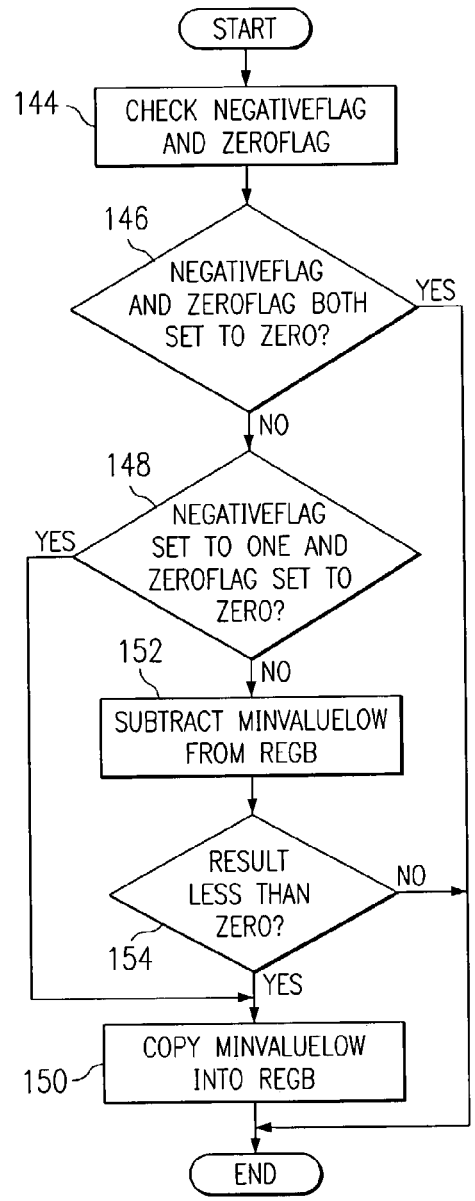
FIG. 5 illustrates an example MAXCUL operation.

FIG. 5 illustrates an example MAXCUL operation. The operation begins at step 144, where NegativeFlag and ZeroFlag are checked. At step 146, if both NegativeFlag and ZeroFlag are set to zero, the operation ends. At step 146, if either NegativeFlag or ZeroFlag is not set to zero, the operation proceeds to step 148. At step 148, if NegativeFlag is set to one and ZeroFlag is set to zero, the operation proceeds to step 150. At step 150, MinValueLow is copied into RegB, at which point the operation ends. At step 148, if NegativeFlag is not set to one or ZeroFlag is not set to zero, the operation proceeds to step 152. At step 152, MinValueLow is subtracted from RegB, which subtraction may, in particular embodiments, include an unsigned subtraction. MinValueLow and RegB may include a 32-bit memory location within data memory 14 and a 32-bit register 28, respectively, or other suitable location, and these operands may be accessed accordingly. At step 154, if the result of the subtraction of MinValueLow from RegB is less than zero, the operation proceeds to step 150. At step 154, if the result of the subtraction of MinValueLow from RegB is not less than zero, the operation ends.

Particular embodiments of the present invention may provide one or more technical advantages. Particular embodiments may limit the value of a 64-bit number to a maximum value, minimum value, or both in a 32-bit environment using only two operations. Such embodiments may in turn reduce code size and time requirements associated with limiting the value of a 64-bit number to a maximum value, minimum value, or both in a 32-bit environment. Certain embodiments may provide all, some, or none of these technical advantages, and certain embodiments may provide one or more other technical advantages.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer implemented method of limiting a double length variable to a maximum value comprising the steps of:
storing a set of most significant bits of a maximum value in a first memory location;
storing a set of least significant bits of said maximum value in a second memory location;
storing a set of most significant bits of the double length variable in a first data register of a set of data registers;
storing a set of least significant bits of the double length variable in a second date register of said set of data registers;
a performing a first subtracting of said set of most significant bits of said maximum value stored in said first memory location from said set of most significant bits of said double length variable stored in said first data register in an arithmetic logic unit;
setting a zero flag within said arithmetic logic unit to 1 and setting a negative flag within said arithmetic logic unit to 0 if said first subtracting produces a zero result;
setting said zero flag to 0 if said first subtracting produces a non-zero result;
setting said negative flag to 1 if said first subtracting produces a less than zero result;
setting said negative flag to 0 if said first subtracting does not produce a less than zero result;
writing said set of most significant bits stored in said first memory location into said first data register if said first subtracting does not produce a less than zero result;
writing said set of least significant bits stored in said second memory location into said second data register if said negative flag is 0 and said zero flag is 0;
performing a second subtracting of said set of least significant bits of said maximum value stored in said second memory location from said set of least significant bits of said double length variable stored in said second data register in said arithmetic logic unit; and
writing said set of least significant bits stored in said second memory location into said second data register if said second subtracting produces a greater than zero result.

2. A computer implemented method of limiting a double length variable to a minimum value comprising the steps of:
storing a set of most significant bits of a minimum value in a first memory location;
storing a set of least significant bits of said minimum value in a second memory location;
storing a set of most significant bits of the double length variable in a first data register in a set of data registers;
storing a set of least significant bits of the double length variable in a second date register in said set of data registers;
a performing a first subtracting of said set of most significant bits of said minimum value stored in said first memory location from said set of most significant bits of said double length variable stored in said first data register in an arithmetic logic unit;
setting a zero flag within said arithmetic logic unit to 1 and setting a negative flag within said arithmetic logic unit to 0 if said first subtracting produces a zero result;
setting said zero flag to 0 if said first subtracting produces a non-zero result;
setting said negative flag to 0 if said first subtracting produces a greater than zero result;
setting said negative flag to 0 if said first subtracting does not produce a less than zero result;
writing said set of most significant bits stored in said first memory location into said first data register if said first subtracting does not produce a greater than zero result;
writing said set of least significant bits stored in said second memory location into said second data register if said negative flag is 1 and said zero flag is 0;
performing a second subtracting of said set of least significant bits of said minimum value stored in said second memory location from said set of least significant bits of said double length variable stored in said second data register in said arithmetic logic unit; and
writing said set of least significant bits stored in said second memory location into said second data register if said second subtracting produces a less than zero result.

* * * * *

UNITED STATES PATENT AND TRADEMARK OFFICE
CERTIFICATE OF CORRECTION

PATENT NO. : 7,580,967 B2
APPLICATION NO. : 10/349336
DATED : August 25, 2009
INVENTOR(S) : Tessarolo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this

Fourteenth Day of September, 2010

David J. Kappos
*Director of the United States Patent and Trademark Office*